FIG. 1.

March 20, 1962   N. J. STODDARD ET AL   3,025,659
METHOD OF THERMALLY PROCESSING NON-THERMOPLASTIC YARN
Filed Feb. 21, 1955   5 Sheets-Sheet 5

Inventors:
Nicholas J. Stoddard
Warren A. Seem
by Howson & Howson
Attys.

United States Patent Office 3,025,659
Patented Mar. 20, 1962

3,025,659
METHOD OF THERMALLY PROCESSING
NON-THERMOPLASTIC YARN
Nicholas J. Stoddard, Philadelphia, and Warren A. Seem, Gwynedd, Pa., assignors to Leesona Corporation, a corporation of Massachusetts
Filed Feb. 21, 1955, Ser. No. 489,693
7 Claims. (Cl. 57—156)

This invention relates to textile yarns which are thermoplastic or have been rendered thermoplastic, and to methods of processing them, being a continuation-in-part of applications for patent Serial Numbers 401,803 and 401,951, filed January 4, 1954, now U.S. Patent Nos. 2,803,108 and 2,803,109, respectively, issued August 20, 1957.

More particularly, this invention is concerned with polyamide and other thermoplastic yarns including nylon, Vinyon, Orlon, Velon, Dacron, saran and the like as well as yarns of cotton, linen, rayon, silk, wool and the like which have been rendered functionally thermoplastic so that they are capable of being thermally shrunk, stretched, stabilized or otherwise processed, and yarn-set by coating or impregnating them with a selected thermoplastic material or which have been given physical characteristics of thermoplastic yarn by applying and curing a selected thermal setting material on said yarn. The invention also relates to methods of thermally shrinking, thermally stretching, thermally processing and/or thermally stabilizing such yarns by thermal treatment with incidental winding, twisting, twisting and untwisting, plying, coning, copping, nubbing, drying, dyeing, coating, singeing, sizing and other normal processing operations, with the aforesaid thermal operations uniformly carried out to substantially whatever degree desired or required and simultaneously with normal yarn processing operations.

In processing polyamides and other thermoplastic chemicals of the kind referred to after conversion into yarns to render them suitable for use in weaving, knitting and other textile operations, it has been the common practice to utilize heat in many forms usch as steam, hot liquids and hot vapors to thermally shrink, thermally stretch, thermally stabilize and otherwise thermally treat the yarn, all such operations being carried out before, after or between normal operations or as separate and independent, thermal operations. For example, to set the twist or stabilize the torsional forces after twisting, pre-twisted thermoplastic yarns wound upon rigid or sometimes collapsible cores were heretofore placed in a heated chamber. On the other hand, to shrink thermoplastic yarns, they were subjected to heat after having been wound into skeins, or upon collapsible cores, or loosely upon rigid cores, and again subjected a second time to heat after rewinding. To stretch completed thermoplastic ply yarns or cords it has been necessary heretofore to resort to a separate thermal stretching operation, and for impartation of dimensional stability, to subject the yarns to heat after winding upon a rigid core, and in some instance, to rewind and again heat treat the yarns.

It has also been the common practice in the past to wind thermoplastic yarns into skeins and to place the skeins into a closed heated treating chamber for shrinking and stabilizing the yarns. Here again, when the shrinkage desired was not consistent with the heat of a relatively high amount necessary for thermal stabilization, additional operations were required in the processing.

When thermoplastic yarns were shrunk as heretofore by subjection to heat after being wound upon collapsible cores, or after being loosely wound upon rigid cores with a second heat treatment after re-winding, one to four extra operations were involved in the treatment. Because of the rigidity of the cores, and the varying resistance to collapsing of the previously wound yarn layers, uneven shrinkage or contraction of the yarns took place throughout the packages, and, as a consequence the treated yarns varied in physical characteristics, i.e., in appearance, denier, size, dyeing properties, elongation, elasticity, strength, residual shrinkage, torsion and the like, these variations and imperfections being carried through into the fabrics ultimately made from the yarn. In the production of fish lines, nets and the like, for example, by prior art methods, the thermal stretching was done as a separate step after previous processing operations, but likewise without attainment of uniformity in the physical characteristics of the finished yarns.

In another prior art procedure for the purpose of attaining dimensional stability, thermoplastic yarns wound upon rigid cores were heat treated, and sometimes again re-wound upon rigid cores and again heat treated. Notwithstanding these heat treatments, the processed yarns lacked uniformity in physical characteristics due to uneven shrinkage as between the inner and outer windings of the yarns on the cores and subjection of the outer windings to the heat for a longer time period than the inner windings during each heat treatment.

Definite irregularities, such as in appearance, denier size, dyeing properties, yield under stress, contractile force, breaking elongation, elasticity, shrinkage or residual shrinkage, torsion, strength stabilization, and the like, exist in packaged thermoplastic yarns as they now come from the producer. These irregularities are due to many uncontrollable conditions during initial conversion of the thermoplastic chemicals into yarn strands, i.e., they are occasioned by variations of tension in the spinning, stretching and packaging operations, by fluctuation in the length of the yarns under changing conditions of temperature and humidity, and by variations in restraint upon the different layers of the yarns in the packages. Such imperfections cause corresponding irregularities in fabrics and other products made from the yarns which detract from the appearance of the products, and frequently preclude use of the yarns in certain products of manufacture. In other cases this conventional yarn processing tends to accentuate the irregularities and causes more pronounced imperfections which further impair the quality of the products manufactured from the yarns, or additionally preclude their use in certain products.

Subjection of thermoplastic yarns to high temperature for prolonged periods of time causes considerable heat degradation. For shrinking and/or stabilization of thermoplastic yarn in packages as has been the common practice heretofore, the packages were exposed in a heated chamber for an hour or more depending upon the size of the packages, the density of the windings and the circulation of the air in the chamber. It has been determined that the loss in tenacity of nylon yarn subjected to a temperature of 284° F. for prolonged periods varies roughly as the logarithm of the time exposure, and when subjected to this temperature for an hour the yarn loses about 4% in tenacity, in two hours it loses about 8%, and in eight hours it loses about 24%. Accordingly, when nylon or other thermoplastic yarns are treated by the usual prior art methods they vary in tenacity and in other physical characteristics such as appearance, denier size, dyeing properties, yield under stress, contractual force, breaking elongation, elasticity, shrinkage or residual shrinkage, torsion, strength, stabilization and the like from the inside to the outside of the packages.

Thus, the processing of thermoplastic yarns by these prior art methods produced results which were not satisfactory from the standpoint of uniformity of the yarns due to the difficulty of maintaining the temperature to which the yarns were subjected constant for a uniform time during the various separate treatments, as well as the inability to maintain a uniform tension on the yarns during such separate treatments and the inability to accurately control the tension in the yarn in correlation to the said temperature and linear speed of travel of the yarns throughout the several treatments. Moreover, the numerous separate treating steps as well as frequent intermediate handlings of the yarns which were characteristic of the prior methods were painstaking, time consuming and expensive and hence added very considerably to the cost of the yarns.

The chief aim of our invention is to overcome the drawbacks in the prior methods of processing thermoplastic yarns in preparation for use in the manufacture of woven, knitted and other textile products, and to make possible the economic production of thermoplastic yarns, and yarns which have been rendered thermoplastic or have been given essential physical characteristics of thermoplastic yarns, which are uniform throughout as regards their previously described physical characteristics. This objective is realized in practice, as hereinafter more fully disclosed, through provision of a simple and reliable method by means of which improved uniformly processed thermoplastic yarns are produced in quantity in a rapid continuous manner at greatly reduced cost. Our method of processing provides the presence of accurately controlled uniform heat and correlated uniform yarn tension which we have discovered to be even more important for the best processing of thermoplastic yarn than the established practice of regulating relative humidity during the processing of other than thermoplastic yarns. This is broadly accomplished by introducing in the path of travel of the yarn during winding, twisting, twisting and untwisting, plying, coning, copping, nubbing, drying, dyeing, coating, singeing, sizing or the like, a thermally insulated regulatable restricted heated zone together with a regulatable yarn tension device, and then uniformly heating the traveling yarn under tension correlated to the temperature of the yarn and its linear speed of travel. Our method of processing cotton, linen, rayon, silk, wool and the like additionally provides the application of thermoplastic and/or thermal setting materials to the yarn prior to the aforesaid travel of the yarn through the aforesaid heated zone. Selected thermoplastic materials which become plastic when heated and more rigid upon cooling are dissolved, suspended or otherwise dispersed in a suitable liquid carrier or vehicle and are applied as an impregnation and/or coating to the traveling yarn during a normal yarn operation and the yarn under uniform tension is passed through the restricted heated zone to evaporate the excess liquid and plasticize the thermoplastic material, with the temperature of the heated zone being correlated to the thermal properties of the yarn and thermoplastic materials, the yarn tension and the linear speed of the yarn. Selected thermal setting materials which when heated become cured, set, polymerized or otherwise modified in form or construction in such a manner that the resultant flexible or rigid material is not subsequently rendered plastic by heating are dissolved, suspended or otherwise dispersed in a suitable liquid carrier or vehicle and are applied as an impregnation and/or coating to traveling yarn during a normal yarn operation and the yarn under uniform tension is then passed through the restricted heated zone to evaporate the excess liquid and cure, set, polymerize or otherwise modify in form or construction the thermal setting materials, with the temperature of the heated zone being correlated to the thermal properties of the yarn and thermal setting materials, the yarn tension and the linear speed of the yarn.

Thermoplastic yarns of the kind referred to materially respond to heat by shrinking or becoming more ductile or plastic and thermally stabilized in cooling which, after subjected to the action of heat assume new and substantially permanent physical characteristics when twisted, stretched or shrunk while heated. The invention is especially concerned with the production of substantially permanently crimped, wavy or fluffed thermoplastic yarns, and also with the production of straight compact thermoplastic yarns of the kinds disclosed in U.S. Patents Nos. 2,353,666 and 2,411,132, granted to Berkley L. Hawthorne and Robert W. Seem, respectively, on July 18, 1944 and on November 12, 1946.

Thus, another object of the invention is to provide a simple, continuous rapid and economical method for the commercially producing uniformly processed, continuous filament thermoplastic yarns having increased elasticity and the appearance of spun yarn; improved thermoplastic spun yarns having a substantially permanent uniform crimp, wave or fluff and increased elasticity; improved continuous filament and discontinuous filament thermoplastic yarns having a substantially permanently reduced luster; thermoplastic yarns characterized as set forth in the two patents, supra; and substantially improved thermoplastic crepe yarns.

More particularly, it is an object of the present invention to provide commercially satisfactory thermoplastic yarns of the type described which are characterized by their lengthwise uniformity and have a permanent uniform helical set or molecular orientation in which the individual filaments of the yarns exhibit a permanent inherent tendency to twist uniformly and assume a spiralled formation.

Figure 1:
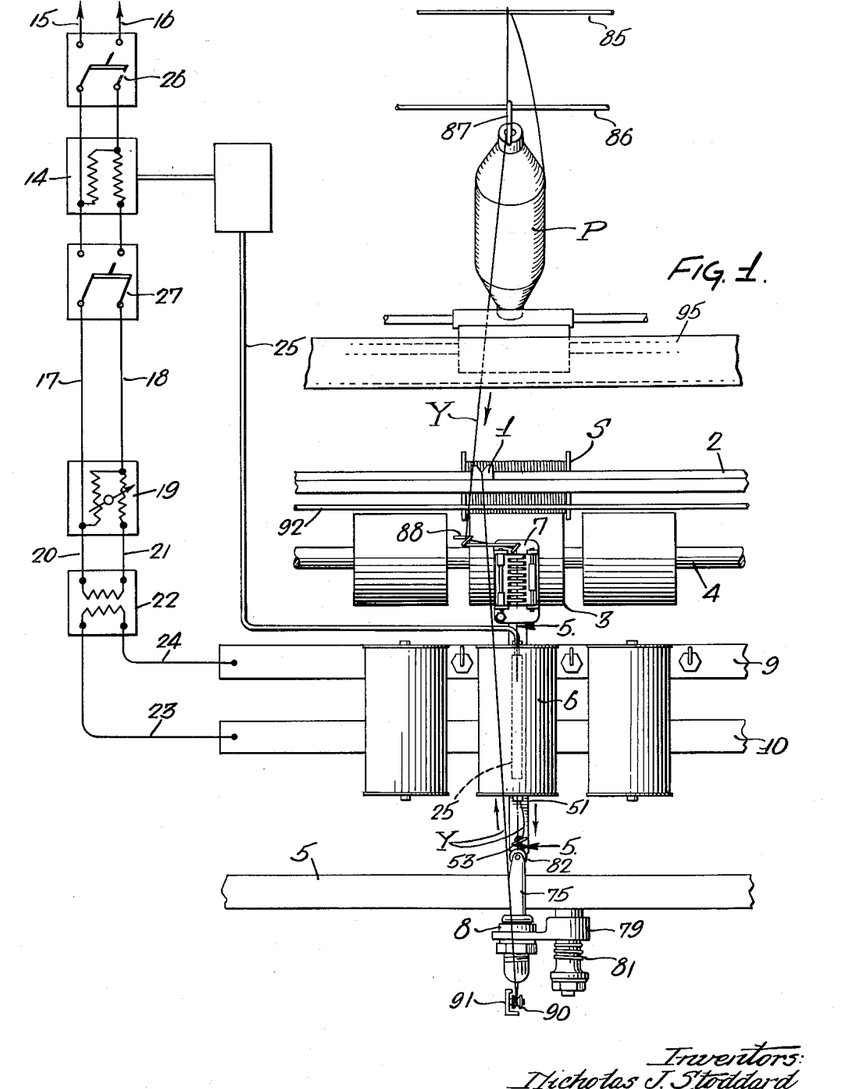
FIG. 1 is a fragmentary view, in front elevation, of one form of apparatus suitable for carrying out our improved method of producing thermoplastic yarns having various improved physical characteristics.
Figure 2:
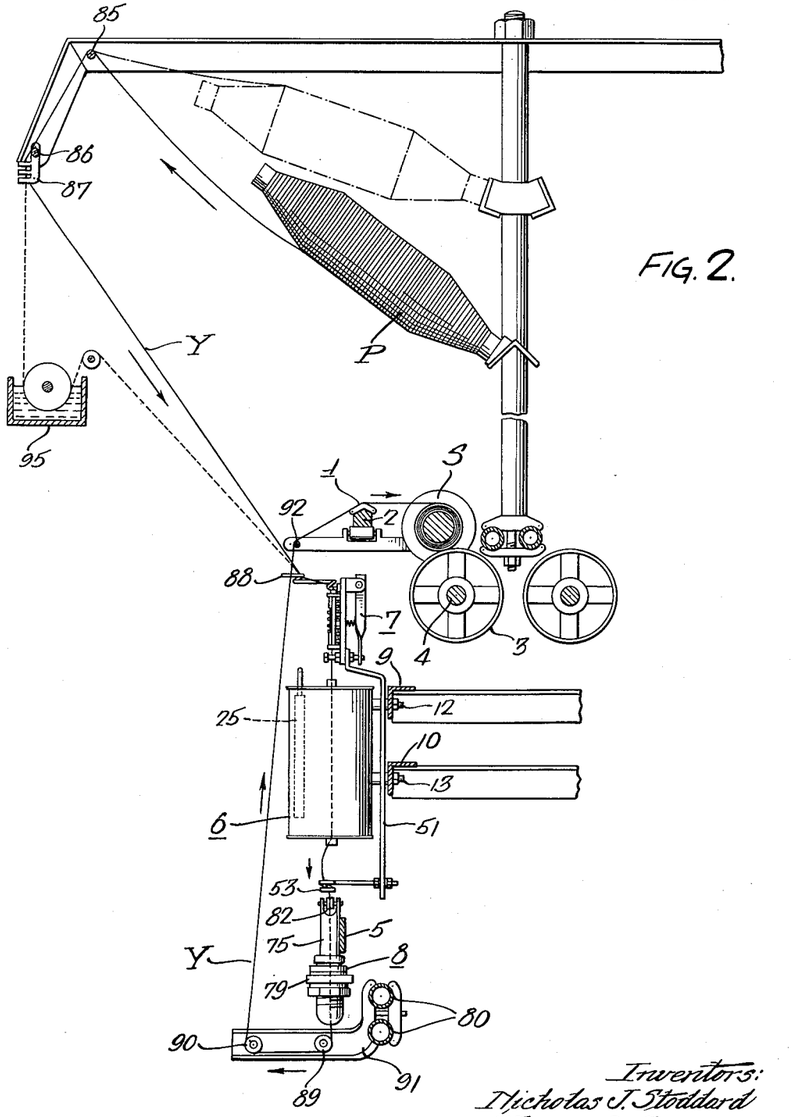
FIG. 2 is a fragmentary view of the apparatus of FIG. 1 in cross-section.

Referring to FIGS. 1 and 2 of the drawings, there is shown apparatus which is basically known in the textile art as an "up-twister" such as is ordinarily employed in twisting yarns, but which has been equipped with twisting and untwisting spindles and other apparatus of the invention. One of the usual guides for distributing the processed yarn upon the corresponding revolving take-up spool S is indicated at 1, the usual traverse bar for the guide at 2, the usual roll for driving the spool at 3, the usual driven shaft for the roll at 4, and the usual spindle driving belt at 5.

A special overhead creel is provided for supporting the package P of thermoplastic yarn Y which is to be processed along with a specially constructed heating device 6, a specially constructed yarn tensioning device 7, and a specially constructed twisting and untwisting spindle 8. As shown, the heating device 6 and the tensioning device 7 are vertically arranged, the latter above the former, in the vertical interval between the spindle 8 and the take-up spool S.

As later on explained, the heating device 6 is electrically heated, current being conducted to it through two fixed horizontally-arranged bus bars 9 and 10 to which the device is secured, with interposition of insulating bushings 11 as best shown in FIG. 2, by screws 12.

and 13. The required degree of heat is uniformly maintained in the device by current at a constant voltage (not exceeding twenty-four volts for personal safety) through an automatic induction voltage regulator 14 from a power line 15, 16, said regulator being connected by conductors 17, 18 to a manually-adjustable induction voltage regulator 19 connected, in turn, by conductors 20, 21 to the primary of a step down transformer 22 in circuit through conductors 23, 24 with the bus bars 9, 10. The output voltage of the induction voltage regulator 14 is automatically governed by a thermally responsive sensing means 25 incorporated in the heating device 6. The automatic and manual induction voltage regulators 14 and 19 and the thermostatic sensing means 25 may all be of any approved standard commercially available types which function cooperatively to control the temperature in the heating device 6 compensatively according to changes in the ambient or room temperature and the rate of transfer of heat therefrom to the yarn so that the restricted zone of the heater 6 through which the yarn passes is heated uniformly. Also included in the lines 15, 16 and 17, 18 respectively, are manually operable safety hand switches 26 and 27.

Figure 5:
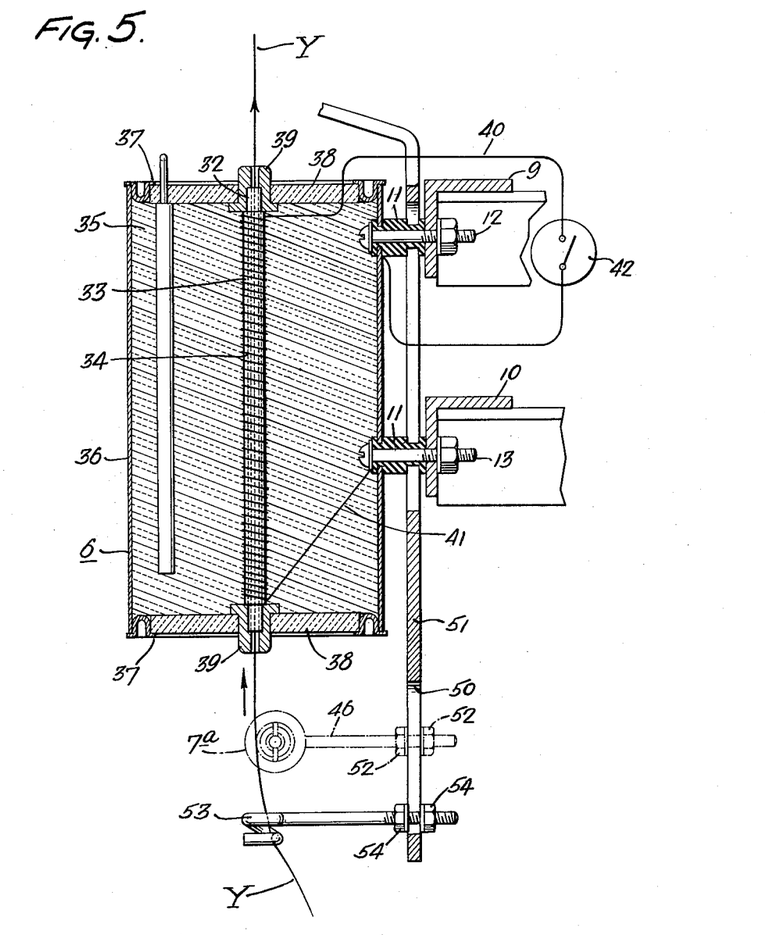
FIG. 5 is a fragmentary view in vertical section, taken on line 5—5, FIG. 1 and drawn to a larger scale, showing one type of a specially designed heating device embodied in the apparatus.

With reference now to FIG. 5, the heating device 6 comprises a central tube 32 which, it is to be understood, is of nonferrous material and of small diameter and bore, and through which the yarn Y is passed; said tube being provided exteriorly with a thin coat 33 of glass or other insulating material, and surrounded by a coil 34 of resistance wire. As further shown, tube 32 is embedded in a thick walled jacket 35 of thermal insulation, which may be of fiber glass or the like encased in a metallic shell 36. At its opposite end the shell 36 is closed by sealed covers 37 which may also be of metal, with interposition between them and the insulation, of disks 38 formed from compressed asbestos or the like to minimize thermal transfer from the hot tube through said shell to the exterior and vice versa. Engaged over the opposite ends of tube 32 and extending through the disks 38, are hard wear-resistant bushings 39 of porcelain or the like which prevent cutting of the tube by the passing yarn.

It is to be particularly noted that the winding pitch of heating coil 34 increases progressively from the bottom end of tube 32 at which the yarn enters to the mid-height of the tube, and then progressively decreases at a corresponding rate toward the end at which the yarn emerges. Accordingly, a greater amount of electrical energy is available at the entrant and the exit ends of tube 32, thereby insuring uniform heat distribution and making possible the use of a much shorter tube than otherwise would be required. The lead 40 from one end of the coil 34 is extended through the insulating jacket 35 to screw 12, and the lead 41 from the other end of said coil to the screw 13, and interposed in lead 40 is a manually operable switch which is diagrammatically indicated at 42.

The tensioning means 7 is supported at the upper end of a vertical bracket bar 51 which is secured to the bus bars 9 and 10 by the screws 12 and 13 and insulated therefrom by the bushings 11. The pigtail guide indicated at 53 has its shank extending through a vertical slot 50 in the lower end of the upright bracket bar 51 so as to be vertically adjustable in the interval between the heating device 6 and the spindle 8, said guide being securable in adjusted positions by the clamp nuts indicated at 54.

Figure 6:
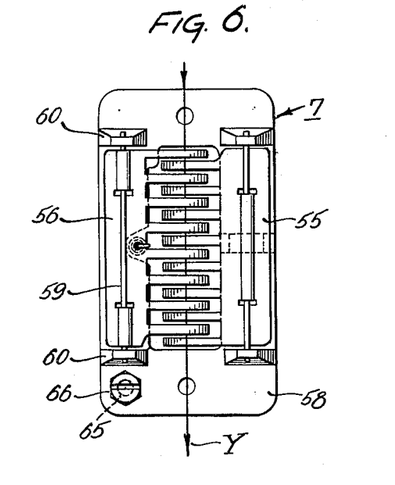
FIGS. 6, 7 and 8, respectively, are a front view, a side elevation and top plan view of a specially constructed tensioning device embodied in the apparatus.
Figure 7:
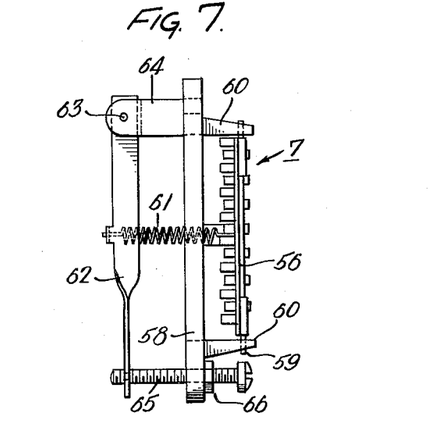
Figure 8:
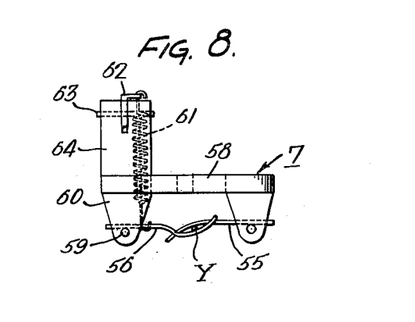

As shown in FIGS. 6, 7 and 8, the tensioning device 7 comprises two comb-like vanes 55 and 56 between the alternating tines of which the yarn Y is passed. Vane 55 is fixedly supported on a bracket plate 58, while vane 56 is swingable about a hinge pin 59 between another pair of vertically-spaced forwarding-projecting lugs 60 of said plate. The swingable vane 56 is connected by a tension spring 61 to a vertical lever 62 fulcrumed at 63 on a rearward projection 64 at the top of the plate 58. The lower or distal end of lever 62 bears against a screw 65 threadedly engaged in plate 58. By means of screw 65, it is possible to vary the force of the spring 61 and, in turn, the pressure exerted by the wing 56 upon the yarn Y to regulate the drag or tension imparted thereto. According to the method of the present invention the tensioning device is adjusted to accurately correlate the tension in the yarn undergoing processing to the temperature to which the yarn is heated and the linear speed of travel of the yarn to maintain the latter at a selected uniform tension relative to the contractile force of the yarn which results from heating and twisting it. The jam nut at 66 serves as a means for securing the screw 65 against accidental displacement in adjusted position.

Figure 9:
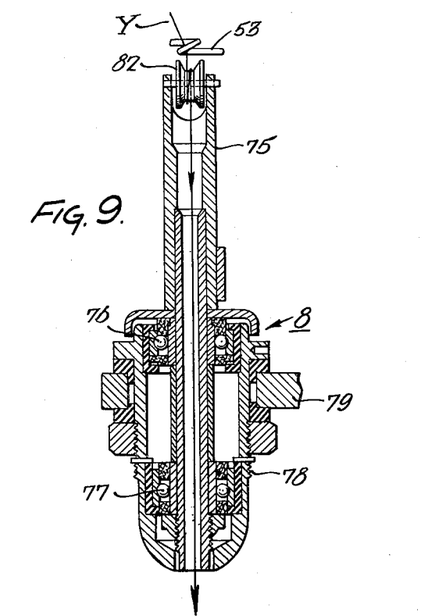
FIG. 9 is an axial sectional view of a specially constructed twisting and untwisting spindle also embodied in the apparatus.

As shown in FIG. 9, the spindle 8 comprises an upright tube 75 of small diameter and bore which is rotatively supported at its lower end by a pair of vertically-spaced anti-friction ball bearings 76 and 77. These bearings are housed within a cylindrical holder 78 set into a retractable arm 79 which is swingably connected in the usual manner from the fixed horizontal rods 80 in the lower part of the apparatus, and which is normally maintained in the position shown by a torsion spring 81 with the tube in tangential contact with the driving belt 5. Freely revolvable about a transverse pin at the upper end of the tube 75 is a small inset V grooved reversed twisting roller 82 around which the yarn Y is wrapped one or more times before passing downward through the tube. Being of small diameter and thin walled, the spindle tub 75 is light in weight and dynamically balanced, and can therefore be revolved at high speeds by the contacting drive belt 5 as will be readily understood.

The thermoplastic yarn Y to be processed is drawn continuously endwise from the supply package P on the creel, passed over guide rods 85, 86 and through a guide eye 87 also on the creel, then downwardly to a pigtail guide 88 provided on plate 58 of the tensioning device 7, then down between the wings of the tensioning device 7 and through the tube 32 of heating device 6, then through the pigtail guide 53, then through the spindle 8, then horizontally under a pair of spaced rolls 89 and 90 on a bracket arm 91 reaching forward from the rods 80, then upwardly over a fixed longitudinal guide rod 92 to the traverse guide 1, and finally to the driven take-up spool S.

For the purpose of illustrating the operation of the arrangement shown in FIGS. 1 and 2 of the drawings, let it be assumed that the yarn Y is in the form of a continuous multi-filament of nylon or the like. As the yarn continually passes down through the heating device 6 it is uniformly heated to a prescribed temperature, for example, within twenty degrees of the melting point of the thermoplastic, to permanently set the yarn with the twist in the yarn. By this it is meant that the yarn thermally treated so that the molecules in the thermoplastic yarn are permanently and uniformly reoriented therein (i.e. yarn-set) according to the twisted formation of the yarn so that the individual filaments of the yarn have a permanent inherent tendency to twist uniformly and assume a uniform spiralled formation. The selected temperature is determined by adjustment of the manual induction voltage regulator 19 in accordance with the ambient temperature and rate of transfer of heat to the yarn which, of course, is in part dependent upon the linear speed at which the yarn is travelling, and this temperature is automatically controlled compensatively with changes in ambient or room temperature and rate of transfer of heat to the travelling yarn by action of the sensing means 25 upon the automatic induction voltage regulator 14. In addition, as previously set forth, the tension device 7 is adjusted to correlate the tension of the yarn to the temperature to which the yarn is heated and the linear speed of travel of the yarn so as to maintain the yarn at a selected uniform tension relative to the contractual force of the yarn resulting from heating and twisting the same so as to preclude substantially any ductility in the cooled yarn.

While heated as described, the yarn is twisted in one direction as it traverses the restricted heated zone of the device 6 by the action of the rapidly revolving spindle 8 and then is cooled by balooning as it advances downward in the interval between the outlet end of the tube 32 of the heater 6 and the wheel 82, the yarn being wrapped for positive control, one or more times, about the small wheel 83 of the untwisting spindle 8 as previously explained, and the cooling being promoted by contact of the yarn with the face of the wheel 82 and the smooth sloping grooved sides of said wheel. By action of the transverse rotation or movement of the wheel 82, the yarn is reversely twisted as it loses frictional contact with the wheel 82 and passes down through the tube 75 of the spindle to the guide wheel 89 and after rounding the latter and the guide wheel 90, it travels upward and after passing over the rod 92 and the traverse guide 1 it is continually taken up by the revolving spool S.

Figures 3, 4:
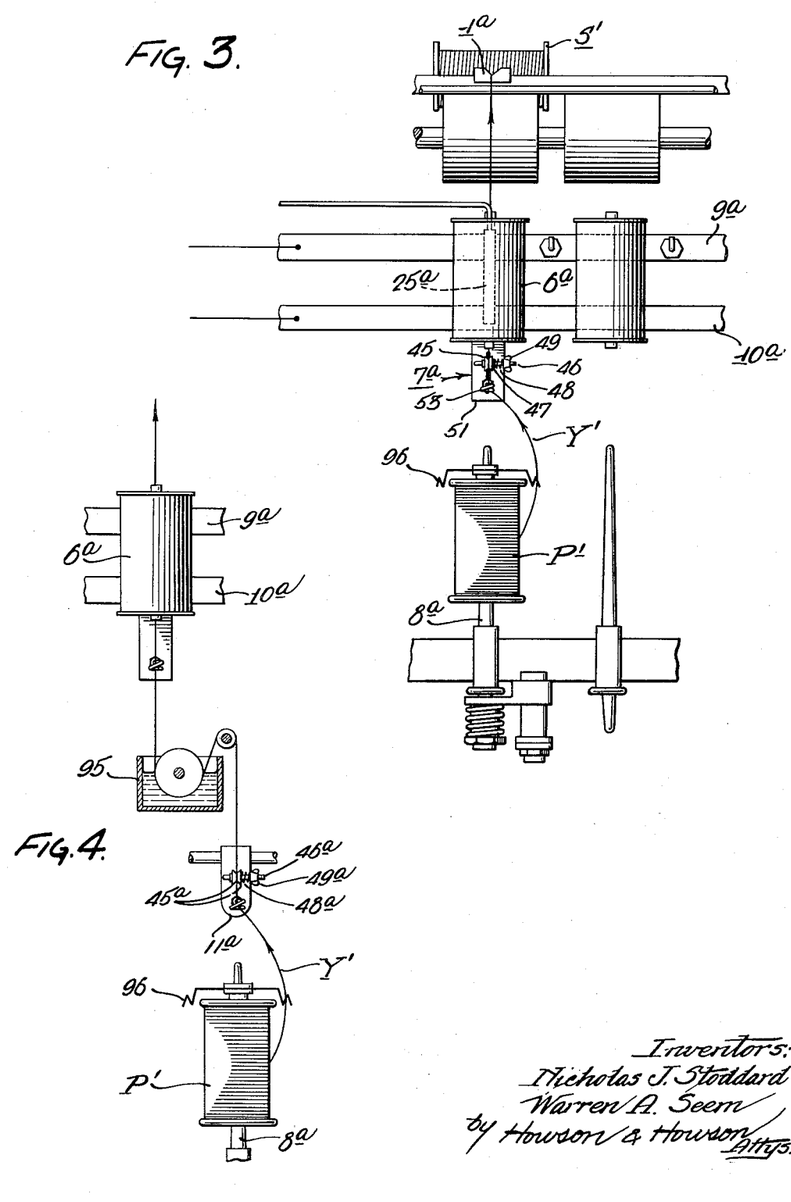
FIG. 3 is a fragmentary view, in front elevation, of another exemplary apparatus suitable for processing thermoplastic yarns in accordance with our improved method.
FIG. 4 is a fragmentary elevational view similar to FIG. 3 showing a modified arrangement thereof for dyeing, sizing or otherwise treating the yarn during processing thereof.

Referring now to FIG. 3 of the drawings, the apparatus there illustrated is also of the type known in the textile art as an "up-twister" but differs principally from the arrangement shown in FIGS. 1 and 2 of the drawings in that the false twist spindle 8 is omitted. Thus, in the arrangement of FIG. 3 there is provided a conventional spindle 8a, yarn tensioning means 7a and a heating device 6a along the line of upward travel of the thermoplastic yarn Y' from the supply package P' to the collecting spool S'.

The heating device 6a of the apparatus of FIG. 3 is of the same construction and arrangement as the heating device 6 previously described and shown in FIG. 5 of the drawings. As in the form of apparatus shown in FIGS. 1 and 2, the device 6a is electrically heated, current being conducted to it through two fixed horizontal bus bars 9a and 10a to which it is secured in the manner previously described in connection with the heater 6. The prescribed temperature is uniformly maintained in the device 6a by electric current at a constant voltage through an automatic induction voltage regulator system the same as that previously described and shown in FIG. 1 of the drawings. The output voltage to the heating device 6a is automatically governed by a thermally responsive sensing means 25a incorporated in the heating device 6a, and the automatic voltage regulator system functions cooperatively the manner previously described to control the supply of heat to the device 6a compensatively with changes in ambient or room temperature and rate of transfer of heat to the travelling yarn to maintain the yarn passage zone of the device 6a uniformly at the temperature required to heat the yarn to the prescribed temperature.

The tensioning or restraining means 7a of the apparatus shown in FIG. 3 and in broken lines in FIG. 5, and comprises, in this instance, a small V grooved wheel 45 about which one or more turns of the yarn Y are wrapped. The wheel 45 is revolvable about the laterally bent end of a supporting shank member 46, and is engaged by a friction disk 47 which is backed by a compression spring 48, the force of the latter being finely regulatable by means of a thumb nut 49. As shown in broken lines in FIG. 5, the shank member 46 extends through a vertical slot 50 in the bracket bar 51 suspended from bus bar 10, and is fixable after adjustment up or down and in and out by means of nuts indicated at 52. Arranged below the tensioning means 7a and similarly supported by the bracket bar 51 with capacity for both up and down and in and out adjustment is a pigtail guide 53 for the yarn Y', said guide being fixable in adjusted position by nuts 54. As in the case of the tension 7 of the apparatus of FIG. 1, the tension 7a of the form of apparatus shown in FIG. 3 of the drawings is adjusted to accurately correlate the tension in the yarn to the prescribed temperature to which the yarn is heated by the device 6a and the linear speed of travel of the yarn in order to maintain the yarn at a uniform tension relative to the contractual force and thermal characteristics of the yarn resulting from heating the yarn.

Again referring to FIG. 3, it will be noted that the thermoplastic yarn Y' from the supply paskage P' is threaded upwardly through one eye of a flier 96 associated with spindle 8a then through the stationary guide 53, then one or more times about the wheel 45 of the tensioning means 7a, then through the thermally isolated restricted heated zone of the heating device 6a, and finally through the traverse guide 1a enroute to the collecting spool S'.

In practicing the method of our invention by the apparatus shown in FIG. 3, the yarn Y' is drawn upward at a uniform linear speed from the supply package P' on spindle 8a by the pull of the rotating take-up spool S', being maintained all the while under a predetermined uniform tension by means of the tensioning device 7a which has been adjusted to correlate the tension to the prescribed heating temperature and linear speed of travel of the yarn as previously described. In the interval between the revolving supply package P' and the wheel 45, the yarn is twisted by rotation of said package. As the yarn traverses the heating device 6a, immediately after being twisted and under uniform tension, it is heated sufficiently to effect a permanent set of the twist in the yarn. Thus, as previously set forth, the yarn is thermally treated so that the molecules thereof are permanently and uniformly reorientated in the yarn according to the twist thereof. By adjusting the thumb nut 49 the resistance to free rotation of the wheel 45 can be varied to control the tension accurately in correlation to the temperature and speed of travel of the yarn to maintain the yarn at a selected uniform tension relative to the contractile force of the yarn resulting from heating it.

During the processing, the temperature in the heating device 6a is maintained at the required degree to heat the yarn to the prescribed temperature by adjustment of the induction voltage regulator system and this heat is controlled compensatively with changes in ambient or room temperature and rate of transfer of heat to the passing yarn by the thermostatic sensing means 25a. It is to be understood that the temperature will be adjusted in accordance with the requirements of the particular kind of thermoplastic yarn which is to be processed, and the tension adjusted in accordance with the characteristics desired in the finished yarn as more particularly described hereinafter.

The effect of heat upon the different thermoplastic yarns now in commercial use is generally known and can be readily determined for new thermoplastic yarns. For each particular thermoplastic yarn various temperatures have a definite effect upon shrinkage, stabilization, tenacity, yield under stress, contractile force, elasticity, breaking elongation and other physical characteristics. Thus in practicing our methods, by controlling the supply of heat energy to the restricted zone through which the yarn is passed to heat the yarn uniformly to a prescribed temperature to reorient the molecules of the yarn to the twisted formation of the yarn thereby to yarn-set the same, and by correlating the tension in said yarn to the prescribed temperature and linear speed thereof to maintain the yarn at a selected uniform tension relative to the contractile force of the yarn, it is possible to produce commercially satisfactory yarns having desirable though different physical properties which in each instance are characterized by their permanency and high degree of uniformity.

For example, by applying tension to the yarn just equal in degree to the contractile force of the yarn at the given temperature, neither shrinkage nor stretching of the yarn will take place. On the other hand, by applying high tension in excess of the contractile force of the yarn maximum stretching will take place throughout the length of the yarn, whereas if tension less than the contractile force of the yarn, shrinkage will be permitted to take place uniformly throughout the length of the yarn. Consequently, by accurately controlling and correlating the tension in the yarn relative to the temperature to which heated and its linear speed of travel, the yarn may be maintained under a uniform tension relative to the contractile force so that the yarn may be drawn helically due to the simultaneous twisting and drawing and this spiralled formation of the yarn substantially remains after untwisting. Many of the thermoplastic yarns such as those previously mentioned herein exhibit varying degrees of ductility when heated and in practicing the methods of the present invention it is usually desirable to process such yarns under correlated tension conditions such as to preclude any substantial ductility in the finished yarn. This is especially so in the case of yarns having thermal characteristics such as Dacron, for example, which exhibits substantial ductility when heated and preferably in most cases is processed according to the present method under sufficiently high tension during heating to preclude substantially any ductility in the finished yarn when cooled.

A spun yarn originally formed from thermoplastic staple or fibers when processed according to our invention will, of course, be attended by results similar to those described above in connection with a continuous multi-filament thermoplastic yarn. Crimp, wave or fluff, as herein referred to, is the result of the individual filaments comprising a yarn assuming a crimped, wavy or curly formation, thereby precluding their previous parallel relationship. Consequently our process applied to mono-filament yarn cannot produce the same effect, but rather causes delustering and the impartation of useful active and latent torsional forces. In accordance with our invention it is also possible to produce straight compact twisted thermoplastic yarns of the kinds disclosed in U.S. Patents Nos. 2,353,666 and 2,411,132 and improvements thereon including nylon, Dacron and other thermoplastic crepe yarns of either smooth or rough texture, depending upon the final twist and the correlation of the temperature and tension of the twisting-untwisting operation.

Thermoplastic yarn treated in accordance with the methods of the present invention takes dyes evenly and greater permanency and depth of color result from the uniform heating at the elevated temperatures and effect an increase in the tenacity and in the modulus of elasticity in certain types of thermoplastic yarns. Thus, the yarn may be dyed as an incident to the processing of the yarn in accordance with the methods of the present invention, for example, by passing it through an applicator such as shown at 95 in FIG. 2 or 4 containing a suitable dye of selected color, the dye being applied to the yarn enroute to the heating device 6 or 6a, as the case may be. In FIG. 2 of the drawings, the passage of the yarn through the dye applicator 95 is shown in broken lines and in FIG. 4 is shown in solid lines. By passing the yarn through the heating device 6 or 6a for processing as described after application of the dye to the yarn, the dye is developed and set by the elevated temperature of the restricted heating zone. In lieu of the use of a dye in the applicator 95, a suitable sizing or other treating liquid may be employed as desired or required and passage of the sized yarn through the restricted heating zone of the heating device will operate to dry the size or other material.

Furthermore, as previously pointed out, the present invention includes the processing of non-thermoplastic yarns of cotton, linen, wool, silk and the like which have been rendered functionally thermoplastic in character to the extent of being made capable of being thermally shrunk, stretched, stabilized or otherwise processed and yarn-set by coating or impregnating them with a selected thermoplastic or thermal setting material. In accordance with the present invention, this may be accomplished by passing a non-thermoplastic yarn through an applicator device such as the applicator 95 in FIGS. 2 and 4 of the drawings in which is contained a selected thermal setting material such as for example, a solution of urea formaldehyde resin. In passing the non-thermoplastic yarn through the applicator 95, the yarn is coated or impregnated with the urea formaldehyde resin and the treated yarn is then caused to pass through the heating device 6 or 6a under controlled temperature conditions and uniform tension correlated to the temperature and linear speed of travel of the yarn in accordance with our methods previously described therein, the treated yarn being twisted or non-twisted as desired prior to passage through the heating device.

The methods of our invention are also applicable to the processing and production of plied yarns in which one or more ends are doubled or plied with one another in accordance with customary practices and procedures in the textile arts. After having been plied or doubled the yarn may be processed in accordance with the methods described herein. Also, in the case of plied thermoplastic yarns, it may be desirable in some instances to process one end of a thermoplastic yarn in accordance with one of the methods herein described, then double or ply this processed thermoplastic yarn with another end of a thermoplastic yarn in accordance with conventional doubling or plying practices and then process the plied or doubled thermoplastic ends of the yarn in accordance with one of the described methods. Thermoplastic yarns may also be plied or doubled with yarns of non-plastic material such as cotton, wool, etc. and processed according to the methods of our invention.

In carrying out our improved processing method it is essential, as already pointed out, that the speed of linear travel of the yarn through the restricted heating zone 6 or 6a must bear a definite relation to the extent or rate of heat transfer to the running yarn and that the tension in the yarn during processing be maintained uniform and be correlated to the temperature to which the yarn is heated and the linear speed of travel of the yarn so that the latter is maintained at a selected uniform tension relative to the contractile force of the yarn.

We have found it to be a simple matter to predetermine the extent of thermal transfer in the restricted heating zone to a particular yarn at any given temperature and any given speed of travel. For example, with a temperature of 485° F. maintained in the heating zone, 200 denier nylon yarn run through said zone at the rate of 600 inches per minute will shrink 8%. Since it is known that a dry temperature of 400° F. is required to shrink 200 denier nylon by the same amount, it is evident that the effective temperature in the heating device for that particular yarn and linear speed of travel must be 400° F. It is to be understood that by "effective temperature" we do not necessarily mean the temperature in the heating zone, but rather to the temperature required to obtain a given effect on the particular thermoplastic yarn involved if said yarn were not travelling but merely heated to that temperature. Thus, by our improved method, it is possible to predetermine thermal shrinking, thermal stretching, thermal processing and/or thermal stabilization to any desired extent within the limits of the characteristics of the particular yarns, with or without incidental twisting as may be desired by regulation of the yarn tension and the temperature of the restricted heated zone. With many types of thermoplastic yarns, the presence of moisture adds substantially to the effectiveness of the heat at a given temperature in the processing. To those familiar with the art, it will be evident that it is a simple matter to adequately wet out the running yarn with water or other liquid solution of effective chemicals prior to passage of the yarn through the restricted heating zone.

In our improved method of processing, it is no longer necessary to accept as unavoidable and to make the best of many of the undesirable and thermal characteristics of processed thermoplastic yarns. Rather, our improved method makes it possible to economically process thermoplastic yarns with utilization of the maximum thermal qualities and improvement of their physical properties.

A few examples are given below of the procedures followed according to our invention in the processing thermoplastic yarns for different purposes and uses.

To prepare nylon yarn for use in the welts of ladies seamless stockings, the manual voltage regulator is adjusted to provide an effective temperature in the heating device 6 or 6a of 250° F. more or less depending upon the temperature used in subsequently preboarding of the hosiery in the usual way, adjusting the tensioning device, and running the yarn in the apparatus after the manner previously described, whereby the yarn is twisted, uniformly shrunk, stretched and/or stabilized to the degree desired. Thermoplastic yarn so processed will lend itself to be formed into uniform stitches by the needles of the knitting machines because it is set and molded to substantially smooth or rod shaped form. If, in the processing, the running nylon yarn is subjected to an effective temperature of 350° F. in the heating device, a tension of less than 0.4 gram per denier will cause the yarn to shrink while being twisted and thermally stabilized. Maintenance of a tension of more than 0.4 gram per denier, with other conditions remaining the same, will result in stretching of the yarn as it is twisted and stabilized; while under a tension of approximately 0.4 gram per denier, the yarn will simply be stabilized as it is twisted, without either shrinking or stretching. This continuous procedure is thus simple as compared with the prior art slow methods of thermoplastic hosiery welt yarn processing which involved the separate stages of redrawing the nylon yarn from the shipping bobbin or pirn; uptwisting the yarn; reeling the yarn into a skein; shrinking the skein yarn while relaxed on a pole or wrapped in a bundle; backwinding the yarn; and finally coning the yarn.

To produce 30 turn 30 denier nylon leg yarn for ladies hosiery in accordance with our method, the twist setting or thermal stabilizing is accomplished simultaneously with uptwisting. In the usual prior art method of processing such yarn, the yarn was first twisted and spooled, and the spool placed for 90 minutes in a chamber wherein the atmosphere was heated to a dry bulb temperature of 170° F. and a wet bulb temperature of 160° F. to set the twist or thermally stabilize the yarn to prevent kinking or snarling in the knitting. Aside from being much more rapid, it will be seen that we have eliminated the double handling required by the prior art methods of preparing nylon leg yarn for ladies hosiery, the improved finished yarn being uniform in its physical characteristics and favoring the production of hosiery of improved attractive appearance, fit and length by reason of the uniformity of its stitches and residual shrinkage.

Another type of new and useful thermoplastic yarn can be produced in accordance with our invention by doubling and twisting two ends at low tension on a doubler-twister equipped with a heating unit constructed as hereinbefore described with an effective temperature of 400° F. maintained therein, one of the ends having had no previous thermal processing but the other end having previously been redrawn under tension through a similar heating unit installed in a conventional redraw machine also at 400° F. effective temperature. As a result of this processing, the end not previously thermally twisted, shrinks substantially and is wrapped by the other end which did not shrink, the finished yarn thus taking on a desirable cork screw appearance.

To produce a 100 denier 70 turn per inch nylon yarn having a sandy surface and substantially devoid of residual shrinkage, in accordance with our invention, we up-twist the yarn 70 turns per inch at 12000 r.p.m. utilizing no flier and relying upon the ballooning, which takes place as the yarn is ravelled from the supply, to impart a low tension of approximately 7 grams. It will be seen that the sandy appearance of the yarn results as a consequence of this high twisting of the unheated yarn at the low tension. Yarn so twisted is then run in the apparatus of FIG. 4 with an effective temperature of 400° F. maintained in the restricted heating zone and thereby thermally shrunk, with attendant accentuation of the sandy appearance.

To produce 100 denier 70 turn per inch nylon yarn having a smooth surface and a dull appearance with substantially no residual shrinkage, the procedure followed is the same as in the example immediately above except for the substitution in the apparatus of FIG. 1 of the modified tensioning means 11a shown in FIG. 4. In this modified tensioning means instead of a grooved wheel, a pair of opposing friction disks 45a are mounted for free rotation upon the laterally bent end of the shank member 46a. The yarn is passed between the disks 45a, one of the latter being yieldingly pressed toward the other by a spring 48a which is finely regulatable by a thumb screw 49a threadedly engaged upon the distal end of the shank member 46a. For the instant purpose, the spring 48a is adjusted to apply a tension of 80 grams upon the yarn as the latter passes between the disks 45a, this degree of tension being greater than the contractile force of the yarn while it is heated to the elevated temperature and is being twisted. This twisting and stretching causes the heated yarn to assume the desired smooth appearance and to have substantially no residual shrinkage.

To produce a 140 denier plied Dacron yarn, having a minimum of residual shrinkage and elongation as well as uniformity of other physical characteristics, in which two ends of 70 denier are each S twisted 24 turns per inch and Z twisted together 20 turns per inch, we first up-twist the respective ends in the apparatus of FIG. 4 with maintenance of an effective temperature of 350° F. in the heating device 6a and application of a tension of 70 grams to substantially stretch said ends and thermally stabilize their torsional forces. With this accomplished, we ply the two ends on a down spinner equipped with a similar heating device maintained at an effective temperature of 380° F. under a tension of 100 grams to further stretch and stabilize the torsional forces, and finally up-twist the yarn 20 turns Z in the apparatus of FIG. 4 at a temperature of 400° F. at a tension of 160 grams to still further stretch and thoroughly stabilize the yarn dimensionally and torsionally. While a generally similar yarn could be produced by utilizing certain procedures known in the prior art, a great many more separate steps and intermediate handlings would have to be resorted to, but such yarn would lack uniformity in physical characteristics for the reasons previously pointed out.

To prepare thermoplastic yarns, suitable for tricot knitting, in accordance with our invention, we first wind the yarn from the producer's delivery packages upon cones at an effective elevated temperature and under a tension consistent with optimum shrinkage and tenacity, by running them in a cone winder equipped with a heating device and a regulatable tensioning device like those described in connection with FIG. 4. In this example, only one normal operation is required. If the same requirements were to be met by prior art conventional methods, at least two additional costly operations would be involved namely, winding the yarn into a skein, and shrinking it while in the skein.

To produce uniformly dyed thermoplastic yarn, having maximum tenacity and a minimum of elongation on cones for use in circular knitting machines, we cone wind the yarn from the producer's package in one operation by first passing it through a trough containing a dye solution before running it through the yarn tension and the heating device in the apparatus of FIG. 4, with the effective temperature and the tension so correlated as to obtain maximum stretch without loss of tenacity. In this example, the yarn is dried and the dye developed by the action of the effective elevated temperature during traverse of the yarn through the restricted heating zone.

Production of such dyed yarns heretofore, required two separate operations to wit: thermal stretching of the yarn, and drying the yarn and developing the dye. Aside from being more costly than yarns produced according to our new method, the processed prior art dyed thermoplastic yarn lacked the desired uniform physical characteristics.

To produce a chemically sized highly twisted uniform nylon yarn with torsional forces stabilized, in accordance with our new method, we run the yarn in a sizing machine equipped with heating and tensioning means like those in FIG. 4, utilizing an effective temperature of 250° F. for stabilization, and a tension of 30 grams. The prior art production of yarns of this type entailed a separate stabilizing operation, and the desired uniformity as to characteristics would not be obtained due to irregular shrinking.

To produce a yarn of maximum strength in which an end of cotton, in accordance with our invention, we therend of thermoplastic yarn is doubled or plied with an mally stretch the thermoplastic end to obtain the same elongation at the breaking point as the cotton end runs the two ends together in the apparatus of FIG. 4, the thermal stretching being thus accomplished simultaneously with the plying. Conventionally, several additional operations would be required for attainment of corresponding results.

To produce substantially permanently set highly twisted crimped, wavy or fluffed Dacron or other thermoplastic yarn in one continuous operation, according to our invention, we run the yarn in an up-twister equipped like the apparatus of FIGS. 1 and 2 with the twisting and untwisting spindle 8 so that the yarn is twisted while heated and under tension adequate to preclude substantially any ductility after cooling, and then cooled, and the untwisting accomplished without interruption in the travel of the yarn. Such processing cannot be done, as far as we are aware, by any prior art method.

To process 70 denier nylon yarn, as received on a pirn from the manufacturer, for attainment of uniformity in appearance, denier size, dyeing properties, elongation, elasticity, residual shrinkage, etc., in accordance with our invention we unwind the yarn from the pirn instead of from a rotated package in the apparatus in FIG. 1, and run it through the apparatus in the same manner as previously described with maintenance of a uniform effective temperature of 385° F. and a uniform tension between 5 and 140 grams.

To produce a rayon yarn having the desirable functional characteristics of thermoplastic yarns in the sense that they are capable of being thermally shrunk, stretched, stabilized or otherwise processed and yarn-set, a rayon yarn is processed on the apparatus of FIG. 2. A cone of rayon is placed upon the creel and as the rayon travels from the cone to the spool S it is impregnated and coated with selected resins, the yarn is twisted ten turns per inch under adequate tension to remove substantially all ductility, the twisted yarn travels through the heated zone where the excess liquid carrier or vehicle is evaporated and the resins are cured, the yarn and resins are cooled before untwisting and treated rayon yarn is untwisted ten turns per inch and wound upon spool S. The curing of the resin upon the twisted yarn gives the ten turn rayon yarn a permanent set similar to that otherwise only obtained with a thermoplastic yarn and upon removal of the twist the yarn has a permanent tendency to return to its twisted position which imparts "life" or resiliency to an otherwise "dead" or limp yarn. The resins also impart substantial water proofing, quick drying and other desirable characteristics not normal to a rayon yarn.

Thermoplastic yarns made according to the present invention are characterized by their high degree of lengthwise uniformity and permanent uniform molecular orientation in selected relation to the twist of the yarn. Thus, in twisted yarns when tensioned the individual filaments of the yarn have a permanent inherent tendency to twist uniformly and assume a uniform spiralled formation and, when relaxed, the individual filaments of such yarns exhibit a permanent uniform twist which defines a uniform spiralled formation. Moreover, the individual filaments of these yarns are uniformly permanent to heat up to their melting point and to tensile stresses up to their breaking strength. Furthermore, in the case of either straight compact or crimped, wavy or fluffed yarns the evenness and uniformity of the structure and form of such straight compact or crimped, wavy or fluffed yarn likewise is permanent and stable to heat substantially up to the melting point of the yarn and to tensile stresses substantially up to the breaking point of the yarn.

It is to be understood that the heating and tensioning devices herein shown are to be considered as exemplary of others which could be used providing that they are capable of maintaining the uniform temperatures and tensions necessary for attainment of the physical characteristics of our improved thermoplastic yarns.

From the foregoing it will be seen that we have provided a simple method by which various kinds of improved thermoplastic yarns for different purposes can be thermally processed more rapidly and at a much lower cost than heretofore, with assurance of uniformity in appearance and other desired physical characteristics.

While certain embodiments of the present invention have been illustrated and described herein, it is not intended that the invention be limited thereto and that changes and modifications may be made and incorporated in the various methods and products within the scope of the following claims.

We claim:

1. A method of imparting to non-thermoplastic yarns the capability of being thermally shrunk, stretched, stabilized and otherwise processed and yarn-set, which comprises, continually drawing the yarn from a source of supply, continually applying to the traveling yarn material selected from the group consisting of thermoplastic and thermal setting resins, continually twisting the yarn, continually passing the yarn at a selected linear speed under uniform tension through a restricted thermally isolated and uniformly heated zone to evaporate the excess liquid and uniformly heat the applied material and yarn to a prescribed temperature to heat the applied material and yarn-set the yarn, controlling the supply of heat energy to said yarn to thereby maintain said heated zone uniformly at the temperature required to uniformly heat said applied material and yarn to said prescribed temperature, continually cooling the yarn to stabilize the same after passage thereof under tension through said heated zone, continually untwisting the yarn after cooling the same, continually collecting the processed yarn, and controlling the tension upon the heated yarn relative to the thermal characteristics of the treated yarn at said prescribed temperature to maintain the same under uniform tension adequate to preclude substantially any ductility in the cooled yarn.

2. A method of thermally processing non-thermoplastic yarn which comprises continually drawing the yarn from a source of supply, continually applying to the traveling yarn material selected from the group consisting of thermoplastic and thermal setting resins, continually passing the treated yarn at a selected linear speed through a restricted thermally isolated and uniformly heated zone to uniformly heat the treated yarn to a prescribed temperature to heat the applied material and yarn-set the treated yarn, controlling the supply of heat energy to said zone to thereby maintain said heated zone uniformly at the temperature required to uniformly heat said yarn and applied material to said prescribed temperature, continually cooling the treated yarn to stabilize the same after passage under tension through said heated zone, winding the processed yarn, maintaining the treated yarn under a uniform tension during heating, cooling and winding thereof, and correlating the tension in said treated yarn to said prescribed temperature and linear speed of travel of the treated yarn to maintain the treated yarn at a uniform tension greater than the contractile force of the treated yarn to stretch and stabilize the same.

3. A method of thermally processing non-thermoplastic yarn which comprises continually drawing the yarn from a source of supply, continually applying to the traveling yarn material selected from the group consisting of thermoplastic and thermal setting resins, continually twisting the treated yarn, continually passing the twisted treated yarn at a selected linear speed through a restricted thermally isolated and uniformly heated zone to uniformly heat the yarn and applied material to a prescribed temperature to yarn-set the treated yarn, controlling the supply of heat energy to said zone to thereby maintain said heated zone uniformly at the temperature required to uniformly heat said treated yarn to said prescribed temperature, continually cooling the twisted treated yarn to stabilize the same after passage under tension through said heated zone, winding the processed treated yarn, maintaining the twisted treated yarn under a uniform tension during heating, cooling and winding thereof, and correlating the tension in said treated yarn to said prescribed temperature and linear speed of travel of the treated yarn to maintain the twisted yarn at a uniform tension greater than the contractile force of the treated yarn to stretch and stabilize the same.

4. A method of producing evenly and permanently crimped, waxy or fluffed multi-filament non-thermoplastic yarn having improved and uniform physical characteristics which comprises, continually drawing the yarn from a source of supply, continually applying to the traveling yarn material selected from the group consisting of thermoplastic and thermal setting resins, continually twisting the yarn drawn from said supply, continually passing the treated yarn at a selected linear speed under uniform tension through a restricted thermally isolated and uniformly heated zone to uniformly heat the yarn and applied material to a prescribed temperature to yarn-set the treated yarn, controlling the supply of heat energy to said zone to thereby maintain said heated zone uniformly at the temperature required to uniformly heat said treated yarn to said prescribed temperature, correlating the tension in said treated yarn to said prescribed temperature and linear speed of travel of the treated yarn to maintain the treated yarn at a uniform tension substantially in excess of the contractile force of the treated yarn resulting from heating and twisting the same to preclude substantially any ductility in the treated yarn after cooling, continually cooling the treated yarn to stabilize the same after passage under tension through said heated zone, continually untwisting the treated yarn to the exact extent to which twisted, and finally continually collecting the processed yarn.

5. A method of producing a non-thermoplastic monofilament yarn characterized by useful active and latent torsional force throughout its entire length which comprises, continually drawing the yarn from a source of supply, continually applying to the traveling yarn material selected from the group consisting of thermoplastic and thermal setting resins, continually twisting the treated yarn, continually passing the treated yarn at a selected linear speed under uniform tension through a restricted thermally isolated and uniformly heated zone to uniformly heat the treated yarn to a prescribed temperature to heat the applied material and yarn set the treated yarn, controlling the supply of heat energy to said zone to thereby maintain said heated zone uniformly at the temperature required to uniformly heat said treated yarn to said prescribed temperature, continually cooling the treated yarn to stabilize the same after passage under controlled tension through said heated zone, continually untwisting the yarn after cooling the same, and finally continually collecting the processed yarn, the tension upon the heated yarn being correlated to the physical characteristics of the treated yarn to preclude substantially any ductility in the cooled yarn.

6. A method of thermally processing non-thermoplastic yarn which comprises applying to the non-thermoplastic yarn a material selected from the group consisting of thermoplastic and thermal setting resins, passing the treated yarn at a selected linear speed under uniform tension through a restricted thermally isolated and uniformly heated zone to uniformly heat the treated yarn to a prescribed temperature to heat the applied resin material and yarn-set the treated yarn, controlling the supply of heat energy to said zone to thereby maintain said heated zone uniformly at the temperature required to uniformly heat said yarn and applied resin material to said prescribed temperature, continually cooling the treated yarn to stabilize the same after passage under tension through said heated zone, winding the processed yarn, and correlating the tension in said treated yarn to said prescribed temperature and linear speed of travel of the treated yarn to maintain the treated yarn at a uniform tension relative to the contractile force and thermal characteristics of the treated yarn resulting from heating the same.

7. A method of producing evenly and permanently crimped, wavy or fluffed multi-filament non-thermoplastic yarn having improved and uniform physical characteristics which comprises, applying to the non-thermoplastic yarn a material selected from the group consisting of thermoplastic and thermal setting resins, twisting the treated yarn, passing the twisted treated yarn at a selected linear speed from under uniform tension through a restricted thermally isolated and uniformly heated zone to uniformly heat the yarn and applied material to a prescribed temperature to yarn-set the treated yarn, controlling the supply of heat energy to said zone to thereby maintain said heated zone uniformly at the temperature required to uniformly heat said treated yarn to said prescribed temperature, continually cooling the treated yarn to stabilize the same after passage under tension through said heated zone, continually untwisting the treated yarn after cooling the same, and finally continually collecting the processed yarn, the tension upon the heated yarn being correlated to said prescribed temperature of the heated treated yarn to maintain the treated yarn under tension adequate to preclude substantially any ductility in the cooled treated yarn.

References Cited in the file of this patent

UNITED STATES PATENTS

| | | |
|---|---|---|
| 2,089,198 | Finlayson et al. | Aug. 10, 1937 |
| 2,111,209 | Dreyfus | Mar. 15, 1938 |
| 2,111,211 | Finlayson | Mar. 15, 1938 |
| 2,169,270 | McNally | Aug. 15, 1939 |
| 2,220,958 | Jennings | Nov. 12, 1940 |
| 2,343,892 | Dodge | Mar. 14, 1944 |
| 2,407,358 | Whisnant | Jan. 23, 1945 |
| 2,411,132 | Hathorne et al. | Nov. 12, 1946 |
| 2,419,328 | Watson et al. | Apr. 22, 1947 |
| 2,463,618 | Heberlein et al. | Mar. 8, 1949 |
| 2,466,808 | Henning et al. | Apr. 12, 1949 |
| 2,509,741 | Miles | May 30, 1950 |
| 2,514,187 | Bosomworth | July 4, 1950 |
| 2,617,007 | Atkins | Nov. 4, 1952 |
| 2,711,627 | Leath | June 28, 1955 |
| 2,775,860 | Morrison | Jan. 1, 1957 |
| 2,803,108 | Stoddard et al. | Aug. 20, 1957 |
| 2,803,109 | Stoddard et al. | Aug. 20, 1957 |

FOREIGN PATENTS

| | | |
|---|---|---|
| 135,137 | Australia | Nov. 7, 1949 |
| 531,093 | Belgium | Aug. 31, 1954 |

UNITED STATES PATENT OFFICE
CERTIFICATE OF CORRECTION

Patent No. 3,025,659                              March 20, 1962

Nicholas J. Stoddard et al.

It is hereby certified that error appears in the above numbered patent requiring correction and that the said Letters Patent should read as corrected below.

Column 13, line 16, strike out "end of cotton, in accordance with our invention, we ther-" and insert the same after "with an" in line 17, same column 13; line 19, after "cotton" insert a comma; same line, for "end runs" read -- and run --.

Signed and sealed this 7th day of August 1962.

(SEAL)
Attest:

ERNEST W. SWIDER                                   DAVID L. LADD
Attesting Officer                                        Commissioner of Patents